United States Patent
Kodama et al.

(10) Patent No.: US 9,573,425 B2
(45) Date of Patent: Feb. 21, 2017

(54) AGRICULTURAL MACHINE TIRE

(75) Inventors: Takashi Kodama, Tokyo (JP); Adriano Tedesco, Rome (IT); Massimiliano Alberelli, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 416 days.

(21) Appl. No.: 14/240,493

(22) PCT Filed: Aug. 24, 2012

(86) PCT No.: PCT/JP2012/071515
§ 371 (c)(1),
(2), (4) Date: Feb. 24, 2014

(87) PCT Pub. No.: WO2013/031706
PCT Pub. Date: Mar. 7, 2013

(65) Prior Publication Data
US 2014/0202606 A1   Jul. 24, 2014

(30) Foreign Application Priority Data

Aug. 29, 2011  (JP) .................................. 2011-186417

(51) Int. Cl.
*B60C 11/00* (2006.01)
*B60C 11/03* (2006.01)

(52) U.S. Cl.
CPC ........ *B60C 11/0311* (2013.04); *B60C 11/0304* (2013.04); *B60C 2011/0313* (2013.04); *B60C 2011/0388* (2013.04); *B60C 2200/08* (2013.04)

(58) Field of Classification Search
CPC ............. B60C 11/0311; B60C 11/0313; B60C 11/0388
(Continued)

(56) References Cited

U.S. PATENT DOCUMENTS 2,324,996 A    7/1943  Coben
2010/0032067 A1   2/2010  Neubauer et al.

FOREIGN PATENT DOCUMENTS

JP    A 35-17201    7/1960
JP    S56-25004 A   3/1981
(Continued)

OTHER PUBLICATIONS

Oct. 9, 2012 Search Report issued in International Patent Application No. PCT/JP2012/071515 (with translation).
(Continued)

*Primary Examiner* — Timothy Kennedy
(74) *Attorney, Agent, or Firm* — Oliff PLC

(57) ABSTRACT

It is an object to reduce tire vibration during high-speed travel on paved roads without lowering traction performance in fields. An agricultural machine tire includes: lug blocks disposed in a tread portion and formed alternately on both sides of a tire equatorial plane in a tire circumferential direction; and a central rib extending in the tire circumferential direction and to which end portions of the lug blocks on the tire equatorial plane side are integrally connected, and when a tire width length of the central rib from connecting portions to the tire equatorial plane is taken as a first rib width and a tire width length of the central rib from end edges of the central rib from the connecting portions across the tire equatorial plane to the tire equatorial plane is a second rib width, the width of the first rib is greater than the second rib.

8 Claims, 9 Drawing Sheets

(58) Field of Classification Search
USPC .................................................. 152/209.8
See application file for complete search history.

(56) References Cited

FOREIGN PATENT DOCUMENTS

| JP | A 58-167208 | 10/1983 |
| JP | A 63-17104 | 1/1988 |
| JP | H05-229312 A | 9/1993 |
| JP | 2001-039124 A | 2/2001 |
| JP | A 2009-51300 | 3/2009 |
| JP | 2010-042806 A | 2/2010 |

OTHER PUBLICATIONS

Jan. 5, 2016 Office Action issued in Japanese Patent Application No. 2013-531293.
Jun. 10, 2015 Search Report issued in European Patent Application No. 12827275.4.

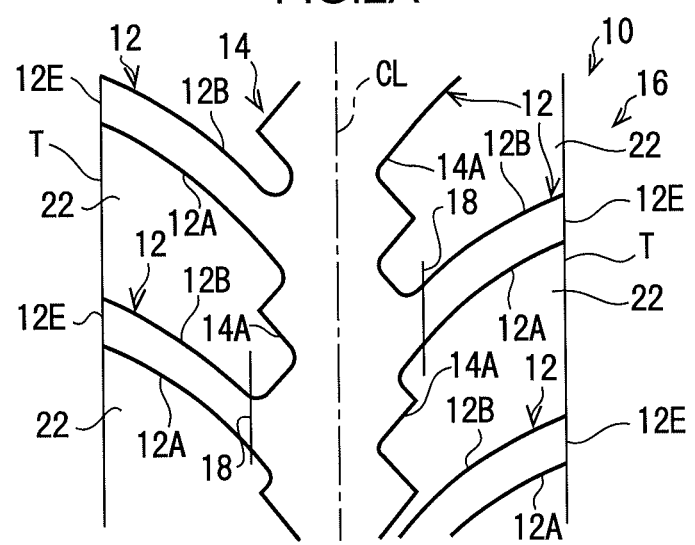

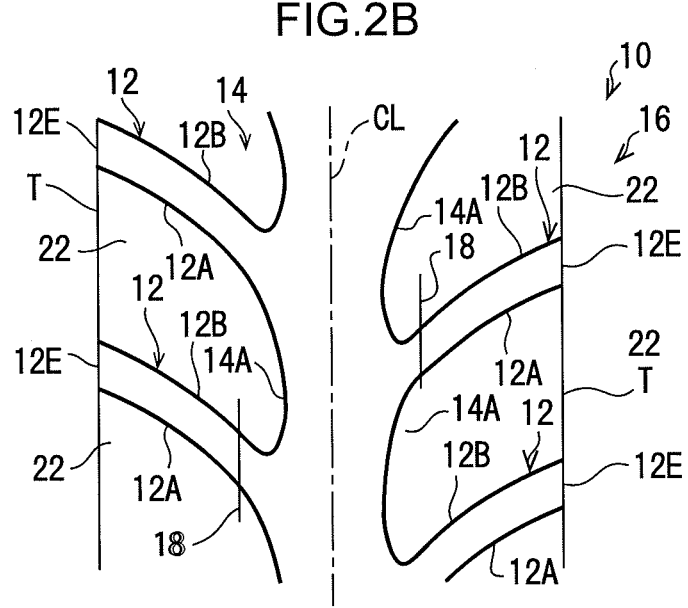

AGRICULTURAL MACHINE TIRE

TECHNICAL FIELD

The present invention relates to an agricultural machine tire.

BACKGROUND ART

A structure has been disclosed where a band-like ridge (rib) is formed in the center of an outside periphery of a tire and where lugs are connected thereto on both legs thereof diagonally with respect to a tire width direction (see patent document 1).

CITATION LIST

Patent Literature

Patent Document 1: Japanese Utility Model Application Laid-Open (JP-Y) No. S35-17201

SUMMARY OF INVENTION

Technical Problem

However, in the conventional example described above, no special consideration is given to the structure of the connecting portions between the rib and the lugs.

Meanwhile, the performance heretofore required of tires used in agricultural machines such as tractors has included traction performance in fields and low compaction performance for not damaging those fields.

However, in recent years, implementations have been made in regard to agricultural tires to increase the speed at which agricultural machines are allowed to travel on public roads (paved roads). Specifically, in the speed ratings in ETRTO standards and TRA standards, the applied speed symbol has changed from B (50 km/h) to D (65 km/h).

In consideration of the above-described circumstances, it is an object of the present invention to reduce tire vibration during high-speed travel on paved roads without lowering traction performance in fields.

Solution to Problem

An agricultural machine tire pertaining to a first aspect of the invention includes: lug blocks that are disposed in a tread portion and are formed alternately on both sides of a tire equatorial plane in a tire circumferential direction; and a central rib that extends in the tire circumferential direction at a tire width direction central portion of the tread portion and to which end portions of the lug blocks on the tire equatorial plane side are integrally connected, and when a tire width direction length of the central rib from connecting portions with the end portions to the tire equatorial plane is taken as a first rib width and a tire width direction length of the central rib from end edges of the central rib positioned on the tire width direction opposite side from the connecting portions across the tire equatorial plane to the tire equatorial plane is taken as a second rib width, the first rib width is configured to be greater than the second rib width.

In the agricultural machine tire pertaining to the first aspect, the lug blocks and the central rib are integrally interconnected in the tread portion, and land portions are continuously disposed, so compared to a case where the lug blocks are independent and there are many edges in the central portion of the tread portion, there are a fewer number of edges and there are fewer variations in tread gauge between the lug blocks accompanying heat shrinkage after vulcanization. For this reason, tire vibration during high-speed travel on paved roads can be significantly reduced.

Furthermore, the tire width direction length (the first rib width) from the connecting portions with the end portions of the lug blocks on the tire equatorial plane side to the tire equatorial plane is configured to be greater than the tire width direction length (the second rib width) from the end edges positioned on the tire width direction opposite side from the connecting portions across the tire equatorial plane to the tire equatorial plane, so the land portion stiffness of the central rib at the connecting portions between the central ribs and the lug blocks can be ensured. Moreover, by making the second rib width relatively smaller, the edges from the lug blocks to the central rib become longer, so because of the edge effect thereof, traction performance in fields can be ensured.

In this way, in the agricultural machine tire pertaining to the first aspect, tire vibration during high-speed travel on paved roads can be reduced without lowering traction performance in fields.

In an agricultural machine tire pertaining to a second aspect, a tire width direction length of the lug blocks in the connecting portions between the central rib and the lug blocks is configured to be greater than a connecting portion rib width, so the edges from the lug blocks to the central rib become longer and the edge effect becomes higher. For this reason, traction performance in fields can be further improved.

In an agricultural machine tire pertaining to a third aspect, the central rib is inclined in alternate directions in the tire width direction with respect to the tire circumferential direction, with the connecting portion rib width as an extension thereof, so the edge effect in the end edges of the central rib can be raised.

In an agricultural machine tire pertaining to a fourth aspect, grooves are disposed in the central rib, so the land portion stiffness of the central rib can be controlled as needed. Because of this, it becomes possible to control the ground contact performance of the central rib in the vicinity of the tire equatorial plane and steering stability performance.

In an agricultural machine tire pertaining to a fifth aspect, a maximum rib width of the central rib is 10% to 30% of the tread width. When this ratio is less than 10%, the effect of the central rib reducing tire vibration becomes insufficient, and when this ratio exceeds 30%, the edge effect of the lug blocks decreases and traction performance in fields is lowered.

In the agricultural machine tire pertaining to the fifth aspect, the ratio of the maximum rib width with respect to the tread width is appropriately set, so a balance between ensuring traction performance in fields and reducing tire vibration can be achieved.

In an agricultural machine tire pertaining to a sixth aspect, the first rib width of the central rib is 10% to 30% of the tread width. When this ratio is less than 10%, the effect of the central rib reducing tire vibration becomes insufficient, and when this ratio exceeds 30%, the edge effect of the lug blocks decreases and traction performance in fields is lowered.

In the agricultural machine tire pertaining to the sixth aspect, the ratio of the first rib width with respect to the tread width is appropriately set, so a balance between ensuring traction performance in fields and reducing tire vibration can be achieved.

In an agricultural machine tire pertaining to a seventh aspect, the second rib width of the central rib is 10% to 30% of the tread width. When this ratio is less than 10%, the effect of the central rib reducing tire vibration becomes insufficient, and when this ratio exceeds 30%, the edge effect of the lug blocks decreases and traction performance in fields is lowered.

In the agricultural machine tire pertaining to the seventh aspect, the ratio of the second rib width with respect to the tread width is appropriately set, so a balance between ensuring traction performance in fields and reducing tire vibration can be achieved.

In an agricultural machine tire pertaining to an eighth aspect, the lug blocks are inclined toward the opposite side of a tire rotational direction from an inner side in the tire width direction to an outer side in the tire width direction, so the land portion stiffness of the lug blocks becomes optimum. For this reason, traction performance in fields can be significantly improved.

In an agricultural machine tire pertaining to a ninth aspect, the range of the angle of inclination is set to 20° to 50°. When this angle of inclination exceeds 50°, the edge effect in the lug blocks decreases and traction performance in fields is significantly lowered. Furthermore, when the angle of inclination is less than 20°, traction performance in fields is sufficiently exhibited but the rolling resistance coefficient (RRC) becomes significantly larger and the tire does not withstand practical use.

In the agricultural machine tire pertaining to the ninth aspect, the angle of inclination of the lug blocks is appropriately set, so a balance between ensuring traction performance in fields and suppressing rolling resistance can be achieved.

Advantageous Effects of Invention

As described above, according to the agricultural machine tire pertaining to the first aspect of the present invention, there is obtained the superior effect that tire vibration during high-speed travel on paved roads can be reduced without lowering traction performance in fields.

According to the agricultural machine tire pertaining to the second aspect of the present invention, there is obtained the superior effect that traction performance in fields can be further improved.

According to the agricultural machine tire pertaining to the third aspect of the present invention, there is obtained the superior effect that the edge effect in the end edges of the central rib can be raised.

According to the agricultural machine tire pertaining to the fourth aspect of the present invention, there is obtained the superior effect that steering stability performance can be controlled.

According to the agricultural machine tire pertaining to the fifth aspect to the seventh aspect of the present invention, there is obtained the superior effect that a balance between ensuring traction performance in fields and reducing tire vibration can be achieved.

According to the agricultural machine tire pertaining to the eighth aspect of the present invention, there is obtained the superior effect that traction performance in fields can be significantly improved.

According to the agricultural machine tire pertaining to the ninth aspect of the present invention, there is obtained the superior effect that a balance between ensuring traction performance in fields and suppressing rolling resistance can be achieved.

BRIEF DESCRIPTION OF DRAWINGS

FIG. 2A is a development view showing a tread pattern of an agricultural machine tire pertaining to a modified example in which a central rib is given a zigzag shape;

FIG. 2B is a development view showing a tread pattern of an agricultural machine tire pertaining to a modified example in which the central rib is given a curved wave shape;

DESCRIPTION OF EMBODIMENT

Figure 1:
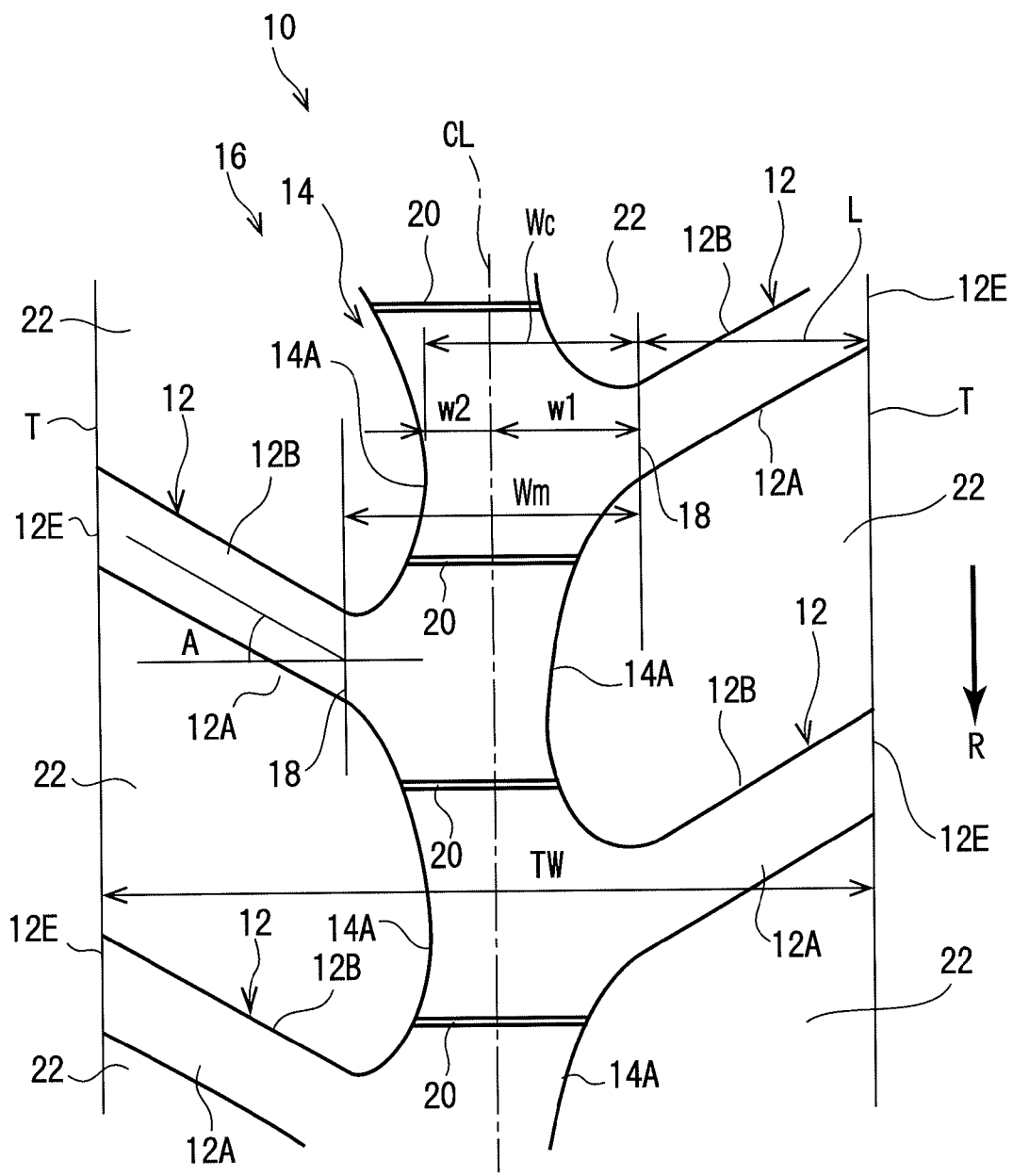
FIG. 1 is a development view showing a tread pattern of an agricultural machine tire.

An embodiment of the present invention will be described below on the basis of the drawings. In FIG. 1, an agricultural machine tire 10 pertaining to the present embodiment has lug blocks 12 and a central rib 14.

The lug blocks 12 are disposed in a tread portion 16, extend in a tire width direction, and are formed alternately on both sides of a tire equatorial plane CL in a tire circumferential direction. The lug blocks 12 are inclined toward the opposite side of a tire rotational direction R from an inner side in the tire width direction to an outer side in the tire width direction.

The central rib 14 extends in the tire circumferential direction at a tire width direction central portion of the tread portion 16. The tire width direction central portion of the tread portion 16 is a region including the tire equatorial plane CL. End portions of the lug blocks 12 on the tire equatorial plane CL side are integrally connected to the central rib 14.

When a tire width direction length from connecting portions 18 between the central rib 14 and end portions of the lug blocks 12 on the tire equatorial plane CL side to the tire equatorial plane CL is taken as a first rib width w1 and the shortest distance in the tire width direction from end edges 14A positioned on the tire width direction opposite side from the connecting portions 18 across the tire equatorial plane CL to the tire equatorial plane CL is taken as a second rib width w2, the first rib width w1 is configured to be greater than the second rib width w2 (w1>w2).

In the example shown in FIG. 1, the lug blocks 12 are configured to have a substantially constant width in the tire circumferential direction in the tread surface, and the outlines of the end edges 14A of the central rib 14 are configured as curves that are convex toward the tire equatorial plane CL side. The end edges 14A are smoothly continuous with end edges 12A on the ground-striking sides of the lug blocks 12 and end edges 12B on the ground-leaving sides of the lug blocks 12 that are adjacent to one another in the tire circumferential direction on each side of the tire equatorial plane CL. Here, the connecting portions 18 are sections at which the sections of the lug blocks 12 having the substantially constant width end and at which the width starts to increase. In other words, the positions of the connecting portions 18 are the end portions of the lug blocks 12 on the tire equatorial plane CL side.

A tire width direction length L from the connecting portions 18 to tire width direction outside ends 12E of the lug blocks 12 continuous with those connecting portions 18 is configured to be greater than a connecting portion rib width Wc that is the sum of the first rib width w1 and the second rib width w2(L>Wc). The tire width direction outside ends 12E are positioned on tread ends T. The size relationship between the tire width direction length L and the connecting portion rib width Wc is not limited to this.

The central rib 14 is inclined in alternate directions in the tire width direction with respect to the tire circumferential direction, with the connecting portion rib width Wc as an extension thereof, for example. Specifically, the central rib 14 extends in the shape of a sine wave, for example, in the tire circumferential direction. The direction of the amplitude of this sine wave is the tire width direction. The central rib 14 may also have a shape that is not inclined alternate directions in the tire width direction with respect to the tire circumferential direction.

It is possible to dispose, as an example of grooves in the central rib 14, transverse grooves 20 that extend in the tire width direction and longitudinal grooves (not shown in the drawings) that extend in the tire circumferential direction, for example. In FIG. 1, between each pair of lug blocks 12 adjacent to one another in the tire circumferential direction, one transverse groove 20 extends along the tire width direction between the end edges 14A on both sides of the central rib 14 in the tire width direction. These transverse grooves 20 include fine grooves and sipes. A fine groove is a groove that does not close when the tread portion 16 has made contact with a paved road, and a sipe is a groove that closes. The groove depth of the transverse grooves 20 is shallower than that of lug grooves 22. The lug grooves 22 are the sections of the tread portion 16 excluding the lug blocks 12 and the central rib 14, which are land portions.

The configuration of the transverse grooves 20, such as their position, number, length, and angle with respect to the tire width direction, is not limited to the configuration described above.

A maximum rib width Wm of the central rib 14 that is twice the first rib width w1 is 10% to 30% of a tread width TW of the tread portion 16.

Here, the tread width TW is the "tread width" as defined in the 2011 YEAR BOOK published by JATMA. In cases where TRA standards or ETRTO standards are applied in the place of use or place of manufacture of the tire, the tread width follows those standards.

The reason the maximum rib width Wm of the central rib 14 is set to 10% to 30% of the tread width TW is because when this ratio is less than 10%, the effect of the central rib 14 reducing tire vibration becomes insufficient, and when the ratio exceeds 30%, the edge effect of the lug blocks 12 decreases and traction performance in fields is lowered.

The maximum rib width Wm in FIG. 1 is slightly greater than 30% of the tread width TW, but this is because the central rib 14 is exaggeratedly depicted. It is preferred that the maximum rib width Wm be 10% to 30% of the tread width TW as described above.

When setting the width of the central rib 14, the first rib width w1 or the second rib width w2 rather than the maximum rib width Wm may also be set to 10% to 30% of the tread width TW of the tread portion 16. Here, the reason the first rib width w1 or the second rib width w2 of the central rib 14 is set to 10% to 30% of the tread width TW is because when this ratio is less than 10%, the effect of the central rib 14 reducing tire vibration becomes insufficient, and when this ratio exceeds 30%, the edge effect of the lug blocks 12 decreases and traction performance in fields is lowered.

When setting the width of the central rib 14, it is also possible to define it by a method other than what is described above.

It is preferred that an angle of inclination A of the lug blocks 12 at the connecting portions 18 with respect to the tire width direction be 20° to 50°.

Here, the reason the range of the angle of inclination A is set to 20° to 50° is because when the angle of inclination A exceeds 50°, the edge effect in the lug blocks 12 decreases and traction performance in fields is significantly lowered, and when the angle of inclination A is less than 20°, traction performance in fields is sufficiently exhibited but the rolling resistance coefficient (RRC) becomes significantly larger and the tire does not withstand practical use.

The angle of inclination A is not invariably limited to the above numerical range.

(Action)

The present embodiment is configured as described above, and the action thereof will be described below. In FIG. 1, in the agricultural machine tire 10 pertaining to the present embodiment, the lug blocks 12 and the central rib 14 are integrally interconnected in the tread portion 16, and land portions are continuously disposed, so compared to a case where the lug blocks 12 are independent and there are many edges in the central portion of the tread portion 16, there are a fewer number of edges and there are fewer variations in tread gauge between the lug blocks 12 accompanying heat shrinkage after vulcanization. For this reason, tire vibration during high-speed travel on paved roads can be significantly reduced.

Furthermore, the tire width direction length (the first rib width w1) from the connecting portions 18 with the end portions of the lug blocks 12 on the tire equatorial plane CL side to the tire equatorial plane CL is configured to be greater than the tire width direction length (the second rib width w2) from the end edges positioned on the tire width direction opposite side from the connecting portions 18 across the tire equatorial plane Cl to the tire equatorial plane CL (w1>w2), so the land portion stiffness of the central rib 14 at the connecting portions 18 between the central rib 14 and the lug blocks 12 can be ensured. Moreover, by making the second rib width w2 relatively smaller, the edges from the lug blocks 12 to the central rib 14 become longer, so because of the edge effect thereof, traction performance in fields can be ensured.

Furthermore, the tire width direction length L of the lug blocks 12 in the connecting portions 18 between the central rib 14 and the lug blocks 12 is configured to be greater than the connecting portion rib width Wc(L<Wc), so the edges from the lug blocks 12 to the central rib 14 become longer and the edge effect becomes higher. For this reason, traction performance in fields can be further improved.

Moreover, the central rib 14 is inclined in alternate directions in the tire width direction with respect to the tire circumferential direction, with the connecting portion rib width Wc as an extension thereof, so the edge effects in the end edges of the central rib 14 can be raised.

In a case where the transverse grooves 20 are disposed in the central rib 14, the land portion stiffness of the central rib 14 can be controlled as needed. Because of this, it becomes possible to control the ground contact performance of the central rib 14 in the vicinity of the tire equatorial plane CL and steering stability performance.

Furthermore, in a case where the transverse grooves 20 are disposed in the central rib 14, the number of edges in the central rib 14 increases, so the edge effect of the central rib 14 becomes even higher. For this reason, traction can be generated not only in the lug blocks 12 but also in the central rib 14 so that traction performance in fields can be improved even more.

Moreover, the ratio of the maximum rib width Wm with respect to the tread width TW is appropriately set, so a balance between ensuring traction performance in fields and reducing tire vibration can be achieved. The same effect is obtained even in a case where, when setting the width of the central rib 14, the first rib width w1 or the second rib width w2 rather than the maximum rib width Wm is appropriately set with respect to the tread width TW.

Furthermore, the lug blocks 12 are inclined toward the opposite side of the tire rotational direction R from the inner side in the tire width direction to an outer side in the tire width direction, so the land portion stiffness of the lug blocks 12 becomes optimum. For this reason, traction performance in fields can be significantly improved.

Moreover, the angle of inclination A of the lug blocks 12 is appropriately set, so a balance between ensuring traction performance in fields and suppressing rolling resistance can be achieved.

In this way, in the agricultural machine tire 10 pertaining to the present embodiment, tire vibration during high-speed travel on paved roads can be reduced without lowering traction performance in fields.

(Modified Examples)

Figure 2C:
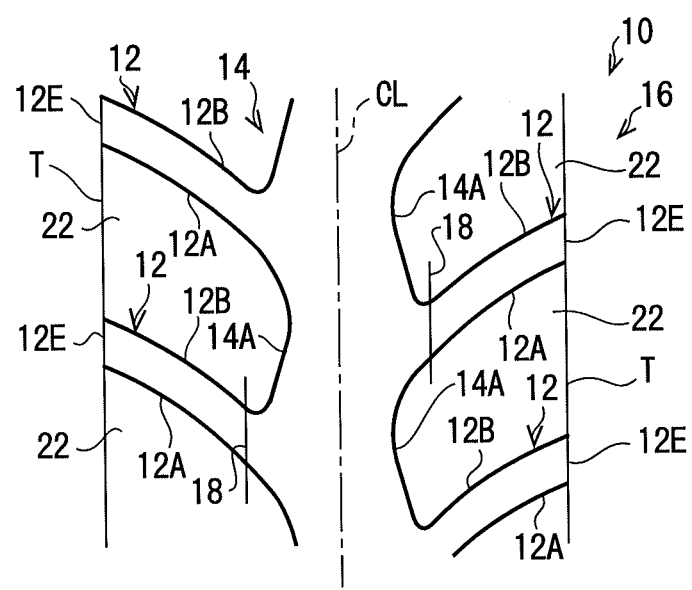
FIG. 2C is a development view showing a tread pattern of an agricultural machine tire pertaining to a modified example in which the central rib is given a bend wave shape.

The shape the central rib 14 is not limited to the shape shown in FIG. 1; for example, the central rib 14 can also be given the shapes shown in FIG. 2A, FIG. 2B, and FIG. 2C. In the example shown in FIG. 2A, the central rib 14 extends in a zigzag shape in the tire circumferential direction. In the example shown in FIG. 2B, the central rib 14 extends in the shape of a sine wave in the tire circumferential direction, and the width of the central rib 14 is greater than the width of the central rib 14 shown in FIG. 1. And in the example shown in FIG. 2C, the central rib 14 extends in a sine wave shape in the tire circumferential direction but differs from the case shown in FIG. 2B in that the amplitude of the sine wave in the tire width direction is greater than in the case shown in FIG. 2B.

The transverse grooves 20 (FIG. 1) are not disposed in any of the central ribs 14 shown in FIG. 2A to FIG. 2C, but the transverse grooves 20 may also be disposed.

(Test Examples)

A vibration test and a traction test were performed in regard to tires pertaining to a conventional example, comparative example 1, working example 1, working example 2, and comparative example 2.

Figure 3A:
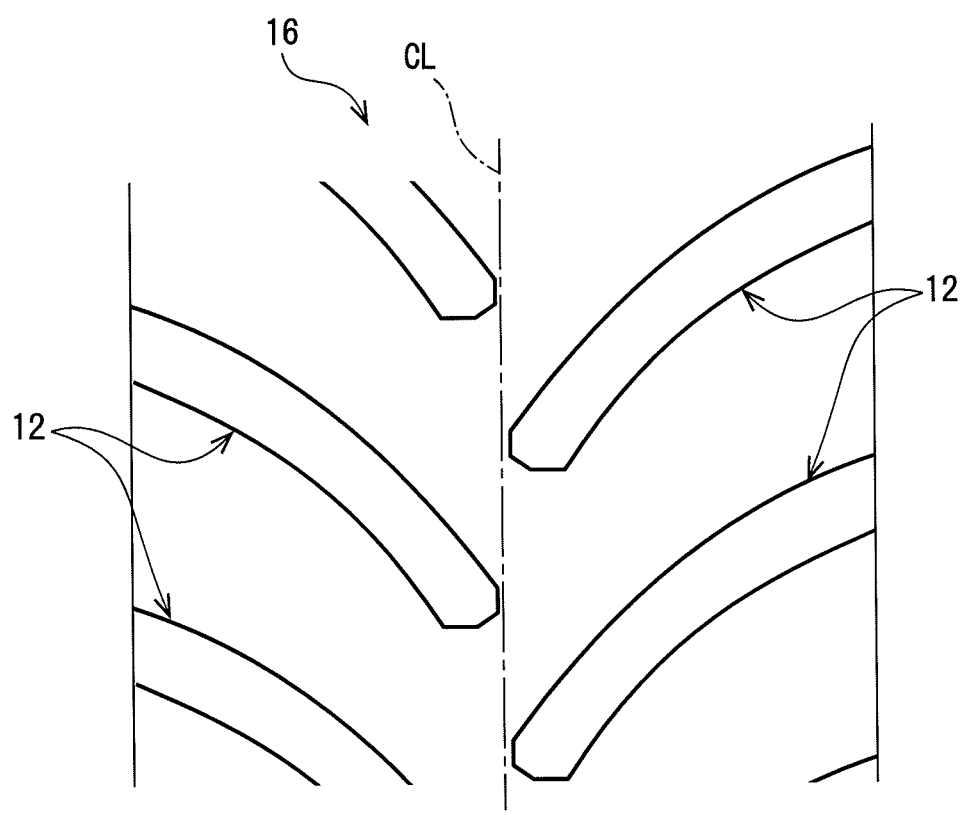
FIG. 3A is a development view showing a tread pattern of an agricultural machine tire pertaining to a conventional example in a test example.
Figure 3B:
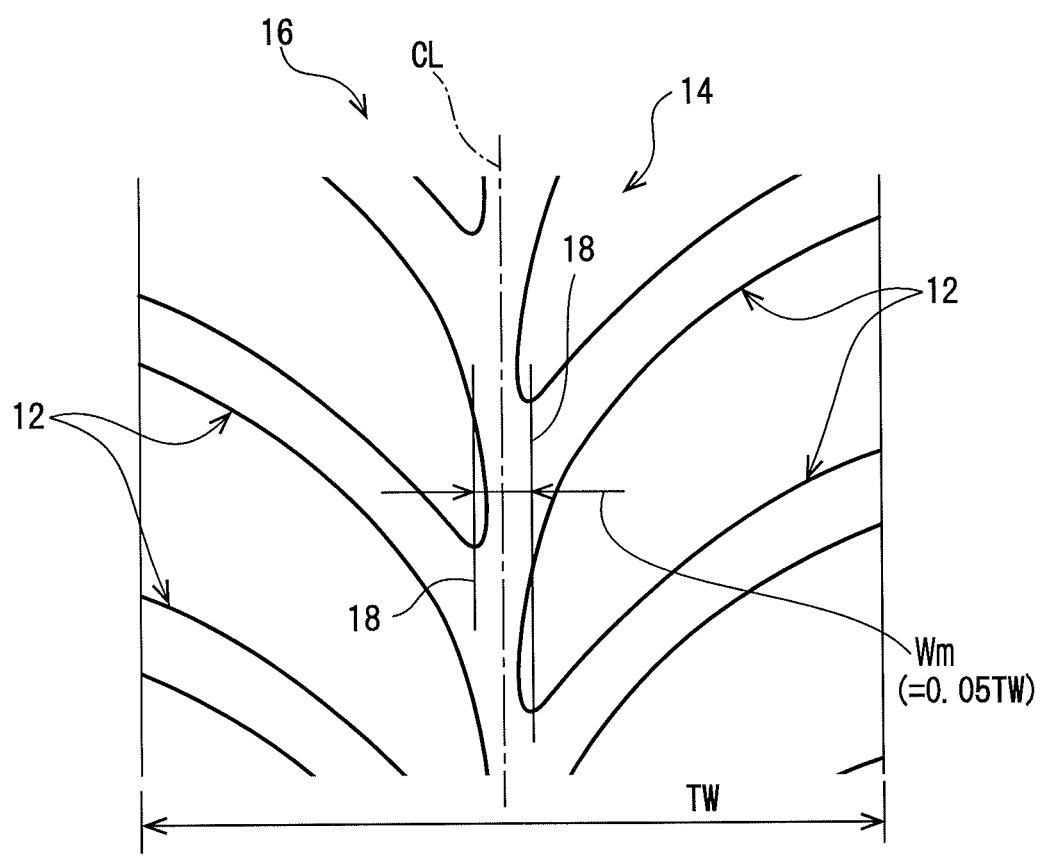
FIG. 3B is a development view showing a tread pattern of an agricultural machine tire pertaining to comparative example 1 in a test example.

In comparative example 1 shown in FIG. 3B, lug blocks 12 are integrally connected to a central rib 14 that extends straightly in the tire circumferential direction. The width Wm of the central rib 14 is 5% of the tread width TW.

Figure 3C:
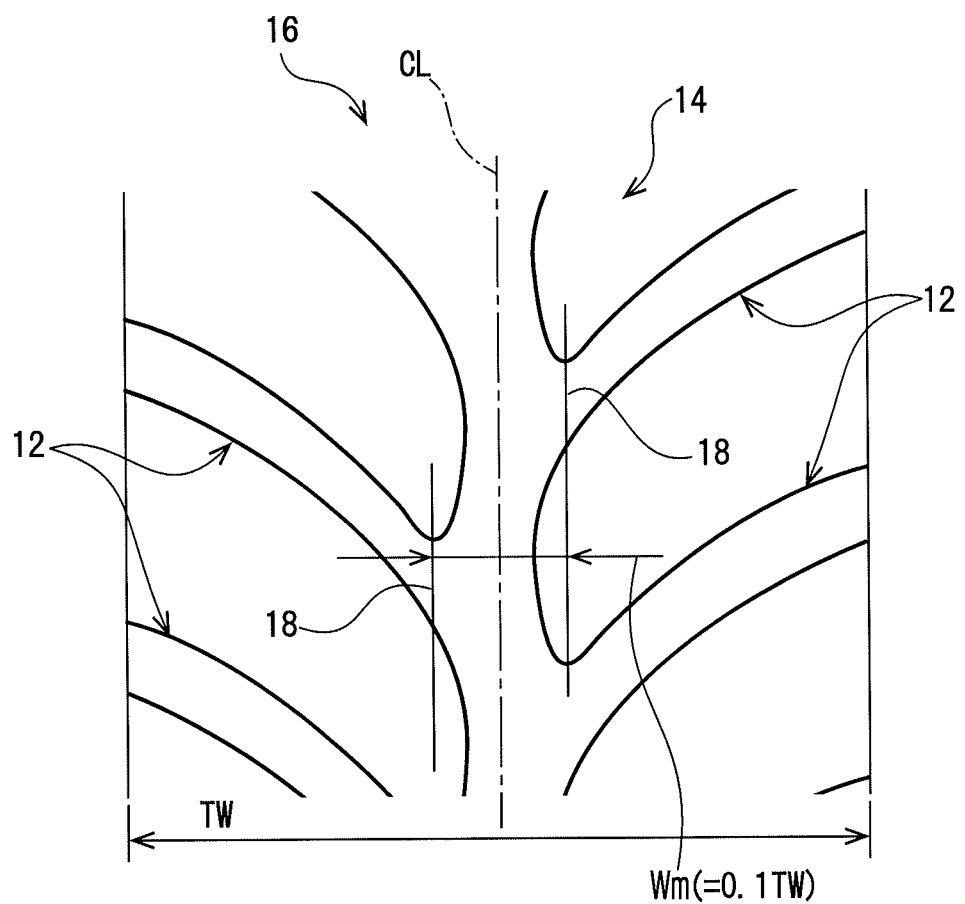
FIG. 3C is a development view showing a tread pattern of an agricultural machine tire pertaining to working example 1 in a test example.

Working example 1 shown in FIG. 3C has the same configuration as that of the embodiment shown in FIG. 1, and the maximum rib width Wm of the central rib 14 is 10% of the tread width TW.

Figure 3D:
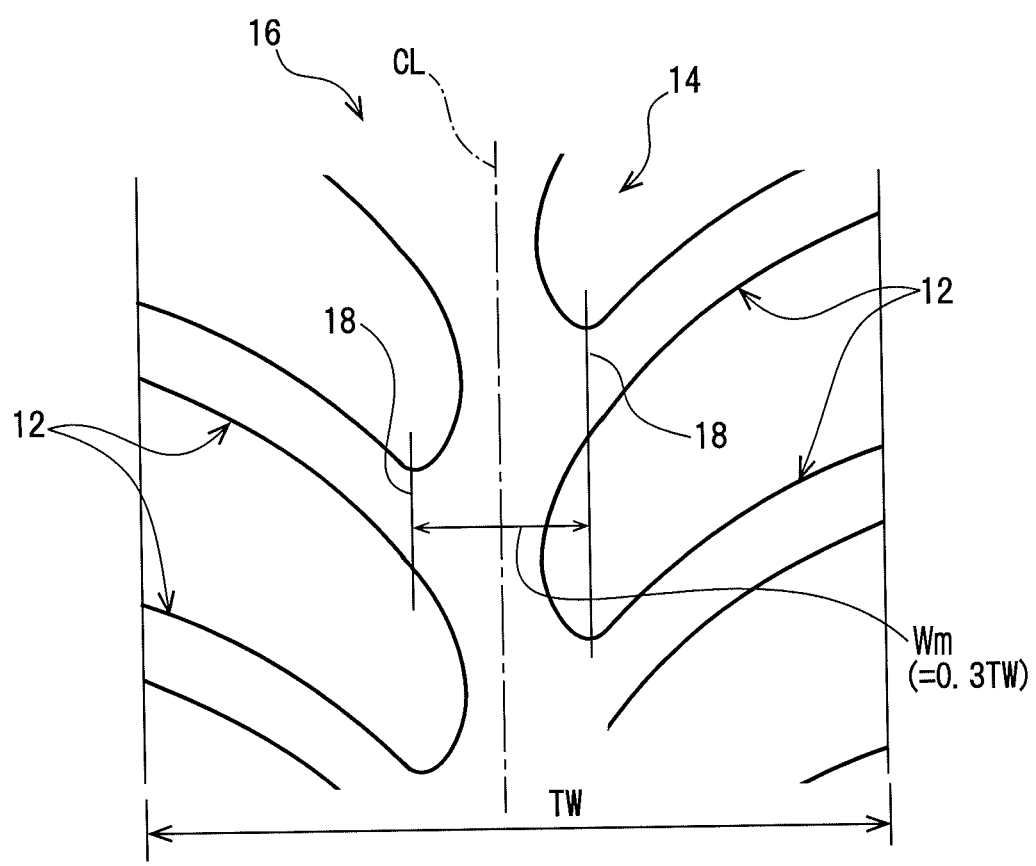
FIG. 3D is a development view showing a tread pattern of an agricultural machine tire pertaining to working example 2 in a test example.

Working example 2 shown in FIG. 3D has the same configuration as that of the embodiment shown in FIG. 1, and the maximum rib width Wm of the central rib 14 is 30% of the tread width TW.

Figure 3E:
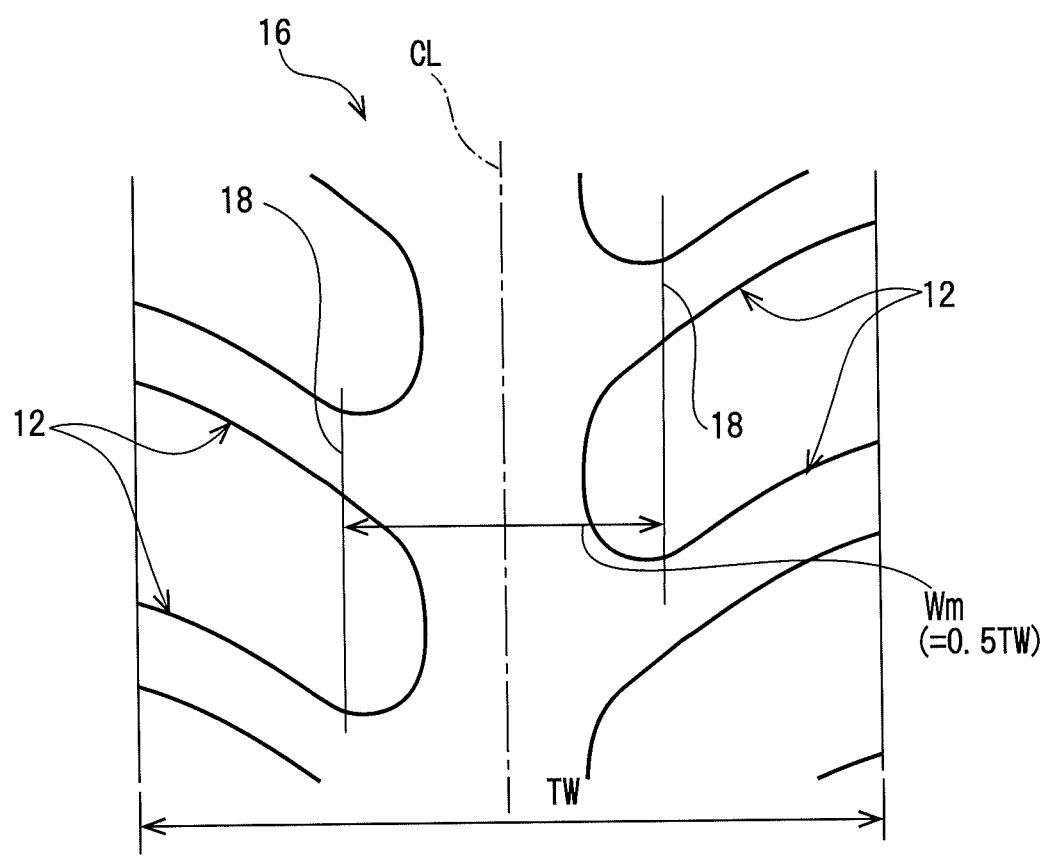
FIG. 3E is a development view showing a tread pattern of an agricultural machine tire pertaining to comparative example 2 in a test example.

In comparative example 2 shown in FIG. 3E, the maximum rib width Wm of the central rib 14 is 50% of the tread width TW.

The angle of inclination of the lug blocks 12 with respect to the tire width direction is 40° in each example. This angle of inclination A is the angle of inclination at the end portions of the lug blocks 12 on the tire equatorial plane CL side in the conventional example and is the angle of inclination at the connecting portions 18 in comparative examples 1 and 2 and working examples 1 and 2.

The tire size is 420/70R28 for the front wheels and 520/70R38 for the rear wheels. The internal pressure is 160 kPa, the front wheel rim width is W13, and the rear wheel rim width is W16. The vehicle is a JD 6910 tractor.

For the vibration test, an accelerometer was installed in a position over the rear cabin in the rear section of the cockpit, and acceleration in the up and down direction when the tractor traveled at a speed of 60 km/h on a paved road was measured. The measurement time was 100 seconds for each measurement, three measurements were performed, and vibration performance was evaluated using the average value of those measurements.

For the traction test, the tires carried a load of 32,830 N (3,350 kgf), maximum traction at a slip rate of 5% to 10% which is a range during use in a common field was measured eight times, and traction performance was evaluated using the average value of those measurements.

The results are as shown in Table 1. The numerical values are all given using an index in which 100 is used for the conventional example. In regard to vibration, the evaluation is better the smaller the numerical value, and in regard to traction performance, the evaluation is better the larger the numerical value.

From Table 1, in comparative example 1, there is no lowering of traction performance but vibration reduction stops at 3% with respect to the conventional example. In comparative example 2, vibration reduction is 27%, which is excellent, but traction performance is lowered 11% with respect to the conventional example.

In contrast, in working examples 1 and 2 having appropriately shaped central ribs 14, the inventors were able to confirm that, compared to the conventional example, vibration during high-speed travel on paved roads can be reduced 20% or more without lowering traction performance in fields.

TABLE 1

|  | Conventional Example | Comparative Example 1 | Working Example 1 | Working Example 2 | Comparative Example 2 |
| --- | --- | --- | --- | --- | --- |
| Vibration | 100 | 97 | 78 | 75 | 73 |
| Traction Performance | 100 | 100 | 100 | 100 | 89 |

REFERENCE SIGN LIST

10 Agricultural Machine Tire
12 Lug Blocks
12E Tire Width Direction Outside Ends
14 Central Rib
14A End Edges
16 Tread Portion
18 Connecting Portions
20 Transverse Grooves (Grooves)
A Angle of Inclination
CL Tire Equatorial Plane
R Tire Rotational Direction
TW Tread Width
Wm Maximum Rib Width
Wc Connecting Portion Rib Width
w1 First Rib Width
w2 Second Rib Width

The invention claimed is:

1. An agricultural machine tire, comprising:
   lug blocks that are disposed in a tread portion and are formed alternately on both sides of a tire equatorial plane in a tire circumferential direction; and
   a central rib that extends in the tire circumferential direction at a tire width direction central portion of the tread portion and to which the lug blocks on the tire equatorial plane side are integrally connected at connecting portions,
   wherein a first rib width is configured to be greater than a second rib width, the first rib width being a distance in a tire width direction from the connecting portions to the tire equatorial plane and the second rib width being a distance in the tire width direction from the tire equatorial plane to end edges of the central rib positioned on an opposite side of the tire equatorial plane from the connecting portions of the first rib width, and
   wherein a distance in the tire width direction
      from the connecting portions to tire width direction outside ends of the lug blocks continuous with those connecting portions is configured to be greater than a connecting portion rib width that is the sum of the first rib width and the second rib width.

2. The agricultural machine tire according to claim 1, wherein the central rib is inclined in alternate directions in the tire width direction with respect to the tire circumferential direction, with the connecting portion rib width as an extension thereof.

3. The agricultural machine tire according to claim 1, wherein grooves are disposed in the central rib.

4. The agricultural machine tire according to claim 1, wherein a maximum rib width that is twice the first rib width is 10% to 30% of a tread width of the tread portion.

5. The agricultural machine tire according to claim 1, wherein the first rib width is 10% to 30% of a tread width of the tread portion.

6. The agricultural machine tire according to claim 1, wherein the second rib width is 10% to 30% of a tread width of the tread portion.

7. The agricultural machine tire according to claim 1, wherein the lug blocks are inclined toward the opposite side of a tire rotational direction from an inner side in the tire width direction to an outer side in the tire width direction.

8. The agricultural machine tire according to claim 7, wherein an angle of inclination of the lug blocks at the connecting portions with respect to the tire width direction is 20° to 50°.

* * * * *